United States Patent [19]
Lambeth et al.

[11] Patent Number: 6,023,736
[45] Date of Patent: Feb. 8, 2000

[54] SYSTEM FOR DYNAMICALLY CONFIGURING I/O DEVICE ADAPTERS WHERE A FUNCTION CONFIGURATION REGISTER CONTAINS READY/NOT READY FLAGS CORRESPONDING TO EACH I/O DEVICE ADAPTER

[75] Inventors: Shawn Michael Lambeth, Pine Island; Charles Scott Graham, Rochester; Daniel Frank Moertl, Rochester; Paul Edward Movall, Rochester; Gregory Michael Nordstrom, Oronoco, all of Minn.

[73] Assignee: International Business Machines Corporation, Armonk, N.Y.

[21] Appl. No.: 08/995,157

[22] Filed: Dec. 19, 1997

[51] Int. Cl.$^7$ ....................................................... G06F 13/10
[52] U.S. Cl. .................................. 710/10; 710/8; 710/19; 710/129
[58] Field of Search ........................... 395/309; 710/103, 710/105, 126, 129

[56] References Cited

U.S. PATENT DOCUMENTS

| | | | |
|---|---|---|---|
| 5,751,975 | 5/1998 | Gillespie et al. | 710/126 |
| 5,793,997 | 8/1998 | Briggs | 710/129 |
| 5,832,238 | 11/1998 | Helms | 710/105 |
| 5,857,083 | 1/1999 | Venkat | 710/129 |
| 5,889,965 | 3/1999 | Wallach et al. | 710/103 |

OTHER PUBLICATIONS

IBM Technical Disclosure Bulletin, vol. 39, No. 01, Jan. 1996, pp. 339–351, "Method for Atomic Peer–to–Peer Communication on a Peripheral Component Interconnect Bus" by B. E. Bakke et al.

IBM Patent Application, Docket RO997–193, Serial No. 08/995,075, filed Dec. 19, 1997, "Enhanced Reset and Built–In Self–Test Mechanisms for Single Function and Multifunction Input/Output Devices".

Primary Examiner—Thomas C. Lee
Assistant Examiner—Chen Yuan
Attorney, Agent, or Firm—Karuna Ojanen; Michael K. Mutter

[57] ABSTRACT

An apparatus, system and method permitting dynamic configuration of I/O device adapters connected to a bus utilizes a function configuration register to store a READY/NOT READY status for each of the I/O device adapters. Upon the occurrence of a reset condition, dynamic configuration decision logic detects which I/O device adapters are connected to the bus, determines configuration parameters for each connected I/O device adapter, initializes the configuration space for each connected I/O device adapter, and then sets a corresponding flag in the function configuration register to indicate ready status. An I/O device driver interrupts a configuration process to examine the function configuration register. If ready status can be confirmed from this function configuration register within a time out period, then the configuration process may proceed; otherwise, a device error recovery process is initiated.

38 Claims, 9 Drawing Sheets

SYSTEM FOR DYNAMICALLY CONFIGURING I/O DEVICE ADAPTERS WHERE A FUNCTION CONFIGURATION REGISTER CONTAINS READY/NOT READY FLAGS CORRESPONDING TO EACH I/O DEVICE ADAPTER

CROSS-REFERENCE TO RELATED APPLICATION

The present invention is related to application Ser. No. 08/995,075 entitled "ENHANCED RESET AND BUILT-IN SELF-TEST MECHANISMS FOR I/O DEVICE ADAPTERS". The Ser. No. 08/995,075 specification is hereby incorporated by reference.

BACKGROUND OF THE INVENTION

1. Technical Field of the Invention

This invention is related to methods, devices and systems for configuring I/O devices. More particularly, this invention relates to dynamically configuring I/O device adapters upon the occurrence of a reset condition. This invention has particular application to I/O device adapters and systems conforming to the PCI (peripheral component interconnect) local bus specification.

2. Description of Related Art

The PCI local bus is an industry standard I/O bus that interconnects computer processor complexes to I/O device adapters. The computer processor complex typically contains a central processing unit (CPU) and system main storage facilities. A PCI I/O device adapter contains hardware, and possibly additional processors and programming to interconnect I/O devices such as disks, computer network interfaces, and so forth, to the processor complex and to control the functions of these I/O devices.

The PCI local bus specification was developed and is controlled by a special interest group formed of a variety of I/O device and computer system vendors that are influential within the personal computer and PC server industry. This specification is defined expressly as a higher performance replacement for the existing standard I/O bus architectures such as the IBM microchannel and extended industry standard architecture (EISA). As such, the PCI local bus specification represents the dominant I/O bus architecture within a very large segment of the computer industry. Furthermore, the PCI local bus specification has been embraced outside of this segment by vendors that participate primarily in other markets, such as enterprise-class network server and mainframe computers. Thus, the scope of computer system and I/O device products that employ PCI local bus implementations is rapidly becoming the majority within the overall computer industry.

FIG. 1 illustrates the basic elements of a conventional PCI local bus implementation including a processor complex 100 having a central processing unit (CPU) 110 and memory 120 interconnected by a processor memory bus 130. The conventional PCI local bus implementation further includes a PCI backplane 200 that is typically a motherboard with a PCI local bus 230, and a PCI connector 205 that interconnect PCI I/O device adapters to the PCI local bus 230.

PCI connectors 205, which may either be a removable-type connector or an embedded, nonremovable connector, are mounted on the PCI local bus backplane 200. The PCI connectors 205 interconnect the PCI local bus 230 and PCI device 240. The implementation shown in FIG. 1 illustrates a removable PCI device 240 that may be easily disconnected from the local bus 230 via a PCI connector 205. The PCI connectors 205 also interconnect the PCI local bus 230 and a PCI multi-function device 260.

PCI card 240 includes an I/O device adapter 250 that behaves as a singular unit on the PCI local bus 230 with respect to its interconnections to PCI local bus 230 and participation in PCI bus signaling protocols. Thus, PCI device 240 and the I/O device adapter 250 are typically referred to as "single function" PCI devices.

The PCI multi-function device 260, on the other hand, includes a plurality of I/O device adapters 252,254. Although the same I/O device adapter 250 may be utilized within the PCI multi-function device 260, reference numerals 252 and 254 are utilized for the I/O device adapters within the multi-function device 250 to indicate additional structure and functionality such as the addition of a processor and memory to implement an I/O processor, or to indicate that the I/O device adapter 252,254 may be unique with respect to the type of I/O device attached thereto.

A function router 270 is included within the PCI multi-function device 260 to interconnect the I/O device adapters 252,254 to the PCI local bus 230. Typically, the function router 270 may be implemented with a multiplexer such that data and/or control signals may be routed between the processor complex 100 and the selected I/O device adapter 252 or 254. The processor complex 100 may individually address the single function PCI device 240 or the PCI multi-function device 260 using a unique device identifier assigned to each PCI local bus connection in which a PCI device 240,260 can be attached. In other words, a unique device identifier is assigned to each slot in which the PCI connector 205 is inserted. This device identifier is the IDSEL, defined by the PCI local bus specification, utilized to uniquely select a desired I/O device on the PCI local bus 230 during PCI configuration read or configuration write signaling protocols. This selection is also performed in the PCI local bus specification by utilizing the configuration read or configuration write signaling protocols defined therein.

The configuration protocol defined within the PCI local bus specification allows the processor complex 100 to individually address each PCI local bus device 250,260 using a physical selection signal that is part of the PCI bus signal definitions. The specification further assigns to each I/O device adapter 250,252,254 a range of processor memory addresses by which the CPU 110 may subsequently communicate with the I/O device adapter 250,252,254.

The PCI multi-function device 260 serves to collect multiple PCI I/O device adapters 252,254 using a single PCI local bus connection. This arrangement is quite practical in that it allows for the evolution from larger physical components to more dense physical integration as components become smaller. Furthermore, this arrangement exploits dense packaging of multiple I/O device adapters 252, 254 to connect an overall increased number of I/O device adapters 252, 254 without adding more connections on the PCI local bus 230 or its backplane 200.

The function router 270 in the PCI multi-function device 260 effectively replaces the two required PCI bus connections with a single PCI bus connection 205. To enable the processor complex 100 to select a particular I/O device adapter 252 or 254 within this multi-function device, the PCI local bus specification configuration protocol appends a function number that ranges in value from 0 to 7 to the device identifier. The PCI local bus specification interchangeably uses the word "function" to refer to the I/O device adapters 250, 252, 254. Single function devices such as PCI device 240 are accommodated in this extended definition by implicitly responding as function zero within the scope of the device ID that selects its PCI bus connection. In essence, the single function PCI device 240 is accommodated within the expanded definition of multi-function device protocols and may be implemented therein by utilizing the function router 270 which merely implements only one function (function zero).

Given that the function number ranges in value from 0 to 7, a PCI multi-function device 260 is then architecturally capable of incorporating up to eight I/O device adapter elements within a single device that requires a single PCI bus connection on the PCI local bus 230. The role of the function router 270 is to facilitate the sharing of the single PCI bus connection amongst the multiple I/O device adapters 252,254 incorporated within the multi-function device 260. In particular, during configuration read and write protocols, the function router 270 uses the function number from this protocol to route the arguments of this protocol between the PCI local bus 230 and the associated PCI I/O device adapter 252 or 254 within the multi-function device 260.

One typical use of a PCI multi-function device 260 is to provide PCI local bus connections to a plurality of I/O device adapters 252,254 and thereby maintain the electrical loads placed on the PCI local bus 230 itself within the allowable limits of the PCI specification. That is, the multi-function device 260 presents a single unit electrical unit load on the PCI local bus 230 while internally allowing for the multiple unit electrical loads associated with a plurality of I/O device adapters 252,254.

A related use of such a device is to allow the I/O device adapters 252,254 to be removable and thereby allow the configuration of the multi-function device 260 to vary, in terms of the number and types of I/O adapter functions that can be detected by the processor complex 100 during PCI configuration processes, according to the specific I/O device adapters 252,254 connected to that multi-function device 260 at any given time. For example, one configuration of such a PCI multi-function device 260 results when a plurality of I/O device adapters 252,254 are connected to the multi-function device 260 and are each detected by the processor complex 100 as individual functions of that multi-function device 260. In such a configuration, each function requires processor complex resources to control that function.

One limitation of the PCI local bus specification is the lack of a device or method to determine the configuration stability of a single-function or multi-function device. This limitation is particularly acute because the configuration of single-function and multi-function devices 240, 260 may change their characteristics at specific points within some process, such as the removal of a connected I/O device adapter or the addition of an I/O device adapter. The ability to remove, add, replace, and reconfigure I/O adapters on a PCI local bus 230 without disruption to the bus 230 or other I/O device adapters sharing that bus is an objective of the PCI special interest group. While this is addressed in this specification for single-function I/O device adapters 240, the limitations of the present PCI multi-function device specification inhibit the ability to render I/O device adapters 252,254 within a PCI multi-function device 260 as removable and otherwise dynamically reconfigurable.

Additionally, one or a series of operations may alter the function configuration of a PCI multi-function device 260 such that functions present in that multi-function device 260 before these operations are no longer present and new functions are present that previously were not. Thus, a PCI multi-function device 260 would benefit from mechanisms that determine when the multi-function device 260 has stabilized its function configuration such that the processor complex 100 may reliably interrogate and otherwise utilize the multi-function device 260 and the new or changed I/O device adapters 252, 254 therein.

As I/O devices typically require a time period in which to stabilize its configuration space with the appropriate configuration parameters, there is a need for a method in which the processor complex 100 determines when the function configuration is stable such that the processor complex 100 may reliably interrogate the new configuration.

Examples of this type of desirable activity which are not found in conventional PCI systems include a single-function device which configures itself based on the external I/O device attached thereto. Another example, mentioned above, is a series of operations that alter the function configuration of a multi-function device. Such operations performed on a PCI multi-function device 260 would benefit from mechanisms for the processor complex 100 to determine when a single or multi-function device has stabilized its function configuration.

In other words, the conventional PCI local bus specification implementation utilizes a static configuration process in which the configuration space within each of the I/O device adapters 250,252,254 is fixed or static at all times. This static configuration is typically implemented with hard-coded configuration space such that the I/O device adapter 252 containing such a hard-coded, static configuration space will always respond or otherwise operate according to the configuration parameters fixed in the configuration space.

SUMMARY OF THE INVENTION

An object of the present invention is to remove the above problems in the PCI local bus specification implementation and facilitate dynamically configuring PCI single-function and multi-function device adapters.

Another object of the present invention is to enhance the variability of the I/O functions according to the number and types of I/O device adapters connected to the system.

Another object of the present invention is to provide a system, apparatus and method that dynamically configures I/O device adapters that are provided in either single-function devices or multi-function devices. Particularly in regards to multi-function devices, an object of the invention is to alter the overall I/O device adapter configuration of a multi-function device according to the interface of individual I/O device adapter functions present at any time.

Another object of the present invention is to permit dynamic reconfiguration of I/O device adapter configuration spaces upon the occurrence of a reset condition.

The objects of the present invention are achieved by providing a function configuration register within a function routing/controlling facility that includes a READY/NOT READY flag for each of the I/O device adapters connected to the function routing/controlling. In this way, the function routing/controlling facility and processor complex can keep track of which I/O device adapters have been configured and which have not.

To further achieve the object of the invention, dynamic configuration decision logic is provided in the function routing/controlling facility that determines which I/O device adapters are connected to the function routing/controlling facility to thereby determine an appropriate function configuration for each of the I/O device adapters. The dynamic configuration decision logic dynamically reconfigures the register space within each of the I/O device adapters and then sets a corresponding signal in the function configuration register to indicate a ready status for that I/O device adapter. By incrementing through all of the available function slots, the dynamic configuration decision logic can then dynamically configure each of the configuration spaces of the I/O device adapters. It is a further characteristic of the dynamic configuration decision logic that it may interact with the I/O device adapters to determine the configuration space parameters of each function and the presence or absence of that device as a function of the multi-function device.

Further achieving the objects of the invention is an I/O device driver provided in the processor complex which examines the function configuration register to determine if the multi-function device and all of the I/O device adapters connected thereto are ready. The I/O device driver must confirm ready status in the function configuration register within a time out period. Otherwise, a device error recovery process must be initiated. If the I/O device driver determines that the multi-function device is ready by examining all of the flags within the function configuration register within the time out period, then the device driver configuration process may continue.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1A:
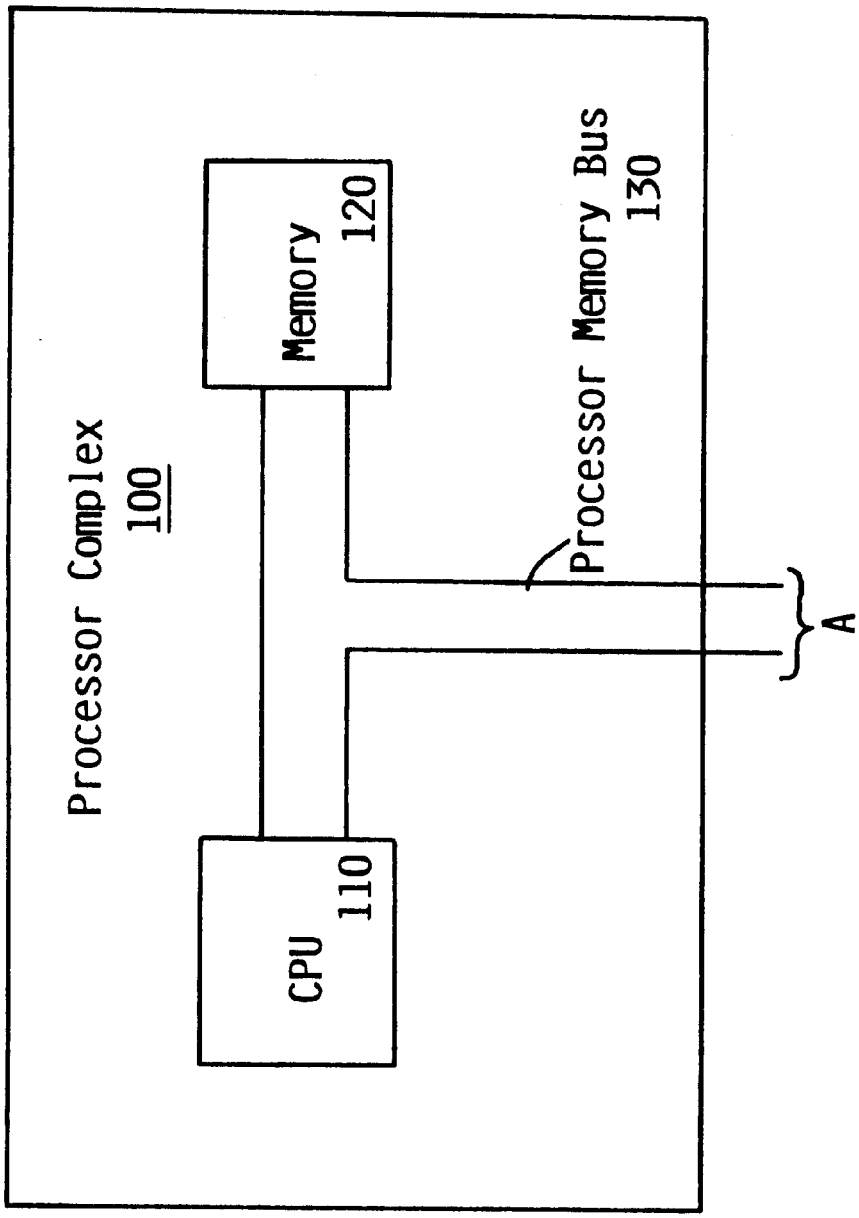
FIG. 1 illustrates a conventional computer system implementing the PCI local bus specification and including both single-function and multi-function PCI devices.
Figure 1B:
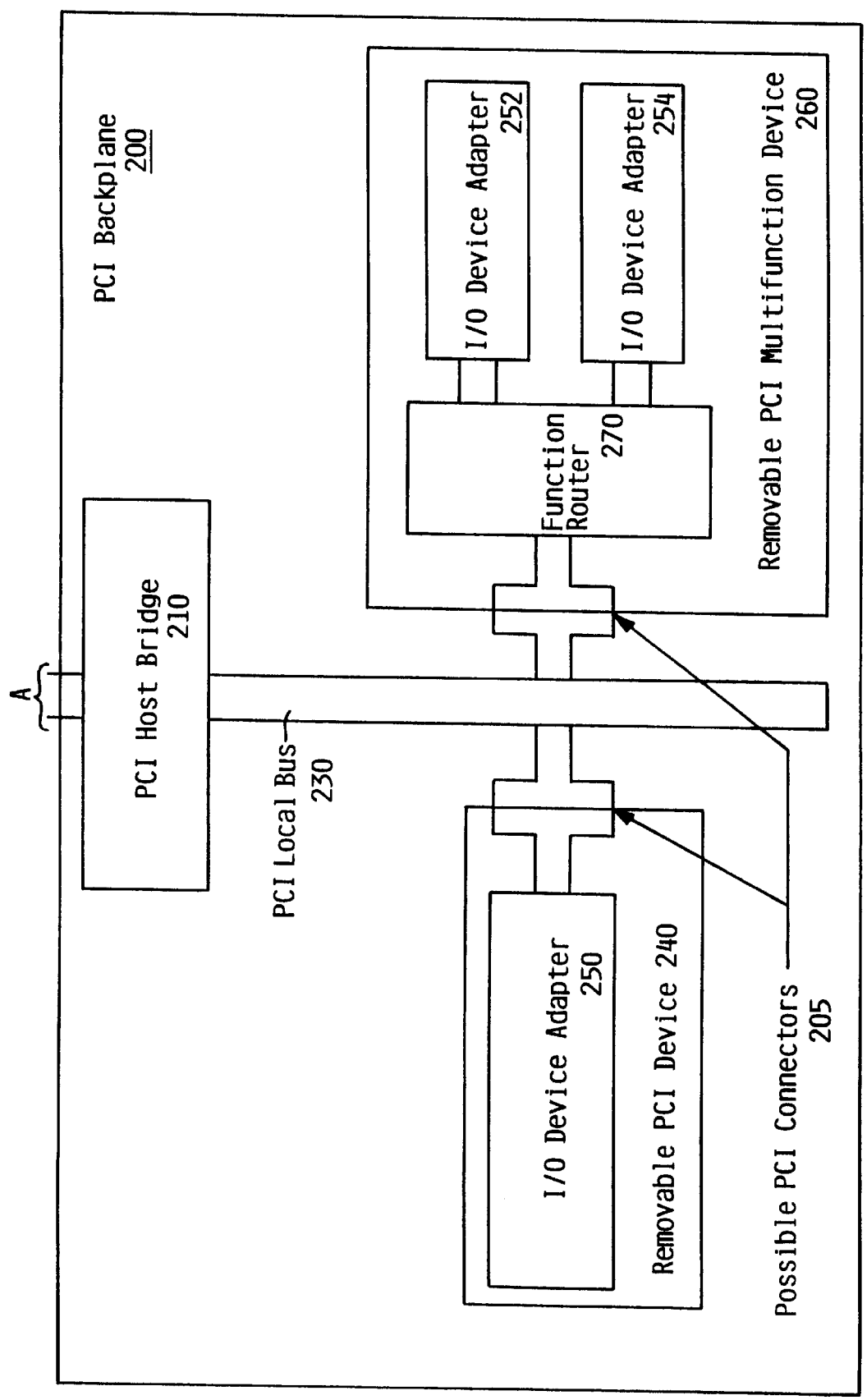
Figure 2A:
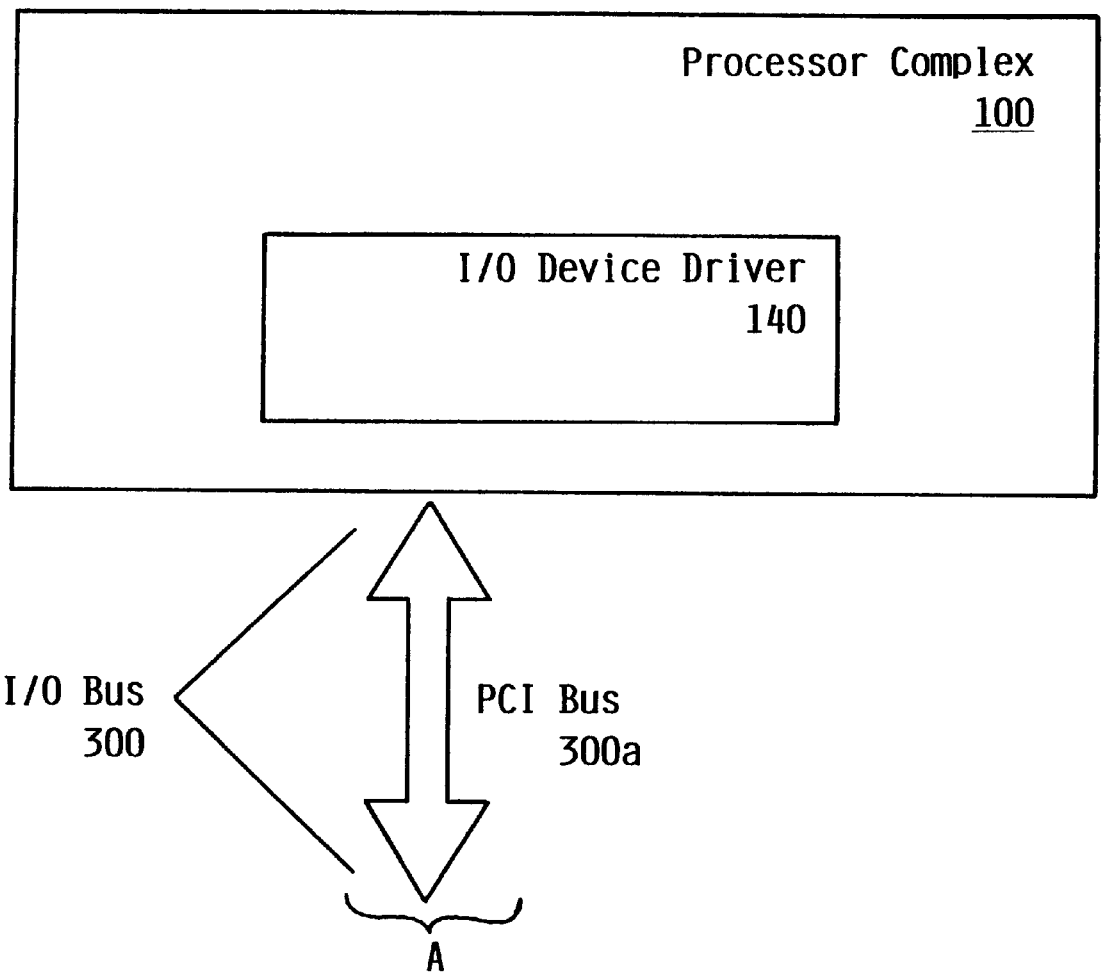
FIG. 2 illustrates a computer system according to the present invention implementing dynamic configuration of a single-function device.
Figure 2B:
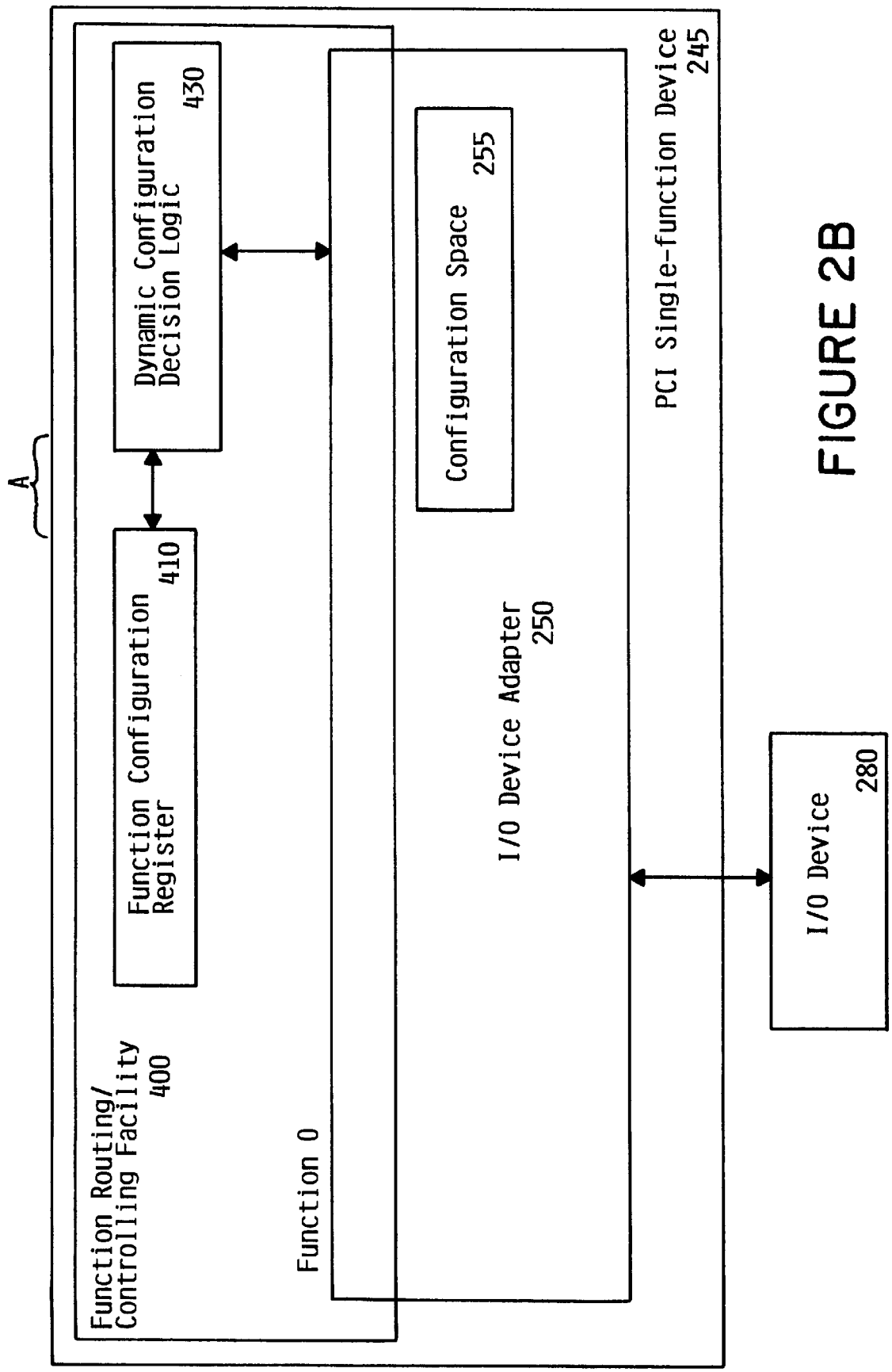
Figures 1, 3A:
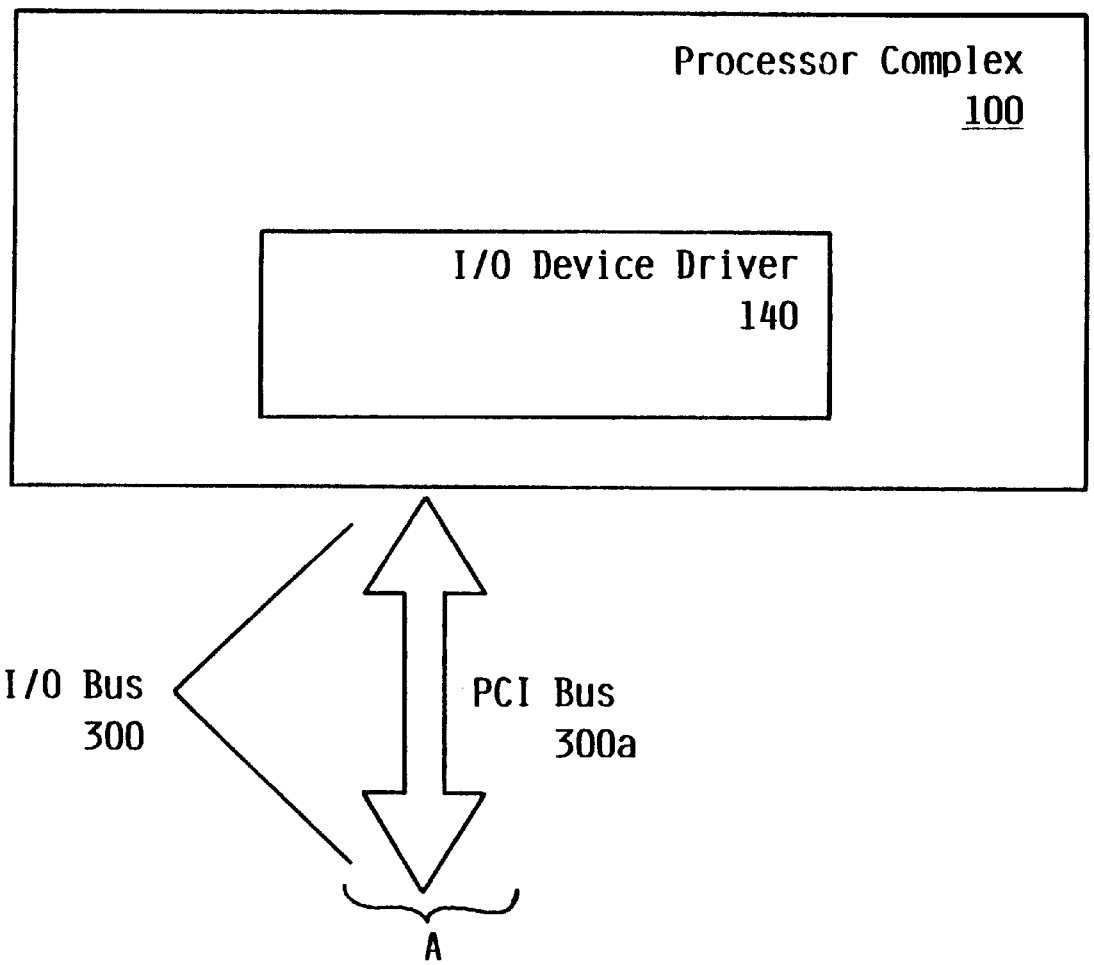
FIG. 3(a) illustrates a computer system according to the invention implementing dynamic configuration of a multi-function device.
Figures 2, 3A:
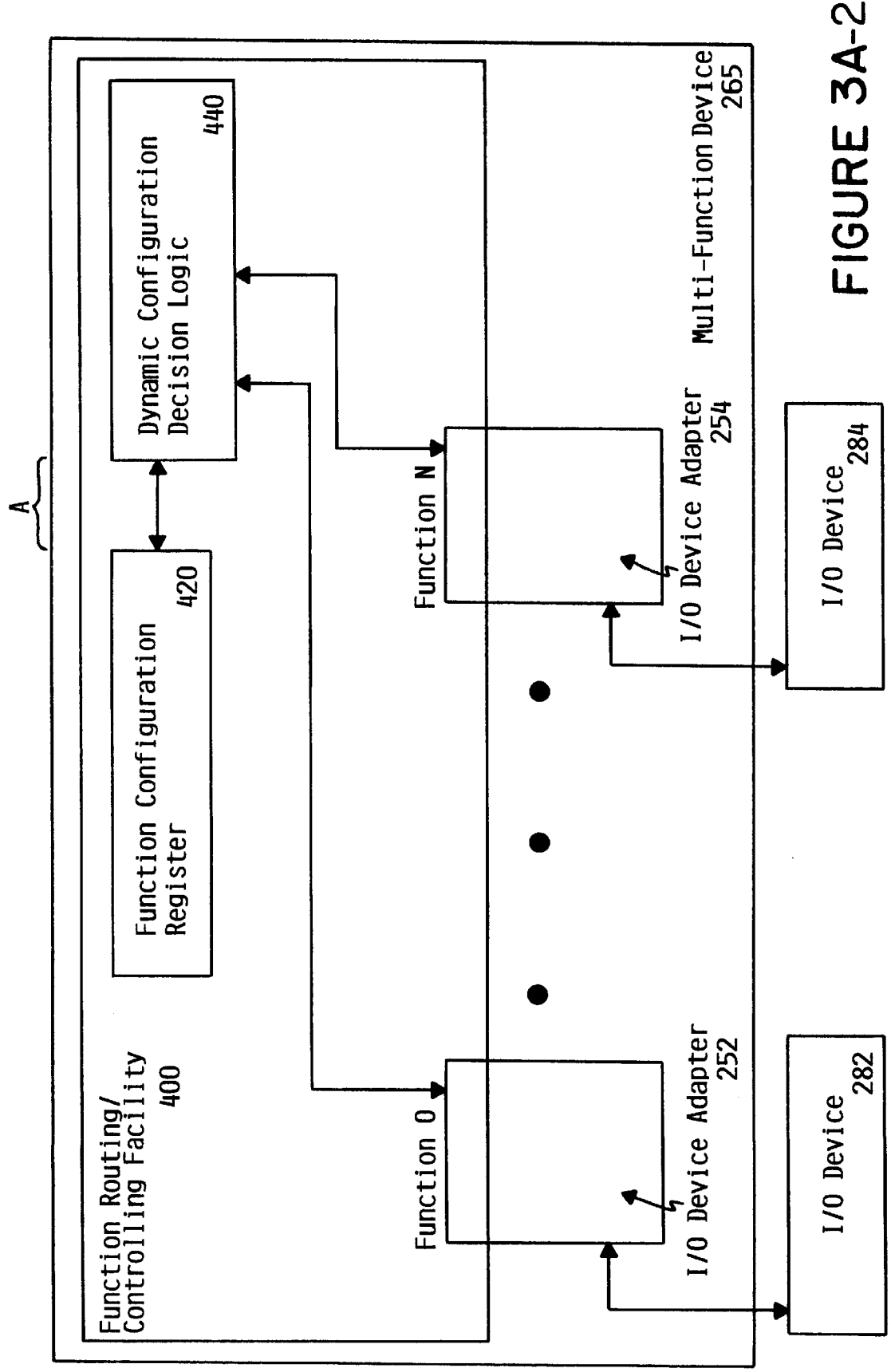

FIG. 2 illustrates a computer system for dynamically configuring a single-function device 245. The processor complex 100 includes a central processing unit (CPU) 110 connected to memory 120 via processor memory bus 13 as shown in FIG. 1.

As shown in FIG. 2, the processor complex 100 further includes an I/O device driver 140 that controls and otherwise manages each of the I/O devices in the system. The I/O device driver 140 of the present invention includes unique elements and functionality that will be described in relation to FIG. 4 below.

As further illustrated in FIG. 2, the inventive computer system includes a single-function device 245 connected to the processor complex 100 via I/O bus 300. Preferably, the I/O bus 300 is implemented with a PCI bus 300a conforming to the PCI local bus specification.

A function routing/controlling facility 400 is located within the single-function device 245 and routes data and/or control signals between the I/O device driver 140 and the I/O device adapter 250 via I/O bus 300. Because FIG. 2 is directed to a system for configuring a single function device, only one I/O device adapter 250 is connected to the function routing/controlling facility 400. Specifically, the I/O device adapter 250 is connected at function zero that is a physical slot or connector within the single function device 245. Furthermore, an I/O device 280 is connected to the I/O device adapter 250 as shown in FIG. 2.

The function routing/controlling facility 400 further includes a function configuration register 410 having a READY/NOT READY flag for each of the I/O device adapters 250 connected to the function routing/controlling facility 400. Because this implementation is for a single-function device 245 having a single I/O device adapter 250, a single READY/NOT READY flag may be utilized as the function configuration register 410. In other words, the function configuration register 410 may actually be only a single bit or flag to indicate ready or not ready status for the I/O device adapter 250.

The function routing/controlling facility 400 further includes dynamic configuration decision logic 430. The dynamic configuration decision logic 430 is connected to the function configuration register 410 to permit reading and writing of the READY/NOT READY flag contained therein. The dynamic configuration decision logic 430 is also connected to the I/O device adapter 250 as shown in FIG. 2, and is capable of directly interacting with the I/O device adapter 250, such as having an ability to read or write the configuration space 255 of that I/O device adapter 250.

The I/O device adapter 250 further includes a configuration space 255. In this invention, the configuration space 255 may be dynamically programmed with a variety of configuration parameters as explained in the operation section below. Preferably, the configuration space 255 conforms to the PCI local bus specification. Furthermore, the configuration space 255 is connected to the decision logic 430 via function zero slot.

The dynamic configuration decision logic 430 may be implemented with hardware, software, firmware or a combination of these implementations. For example, the dynamic configuration decision logic 430 may be implemented with a separate processor and memory programmed with the dynamic configuration decision logic process illustrated in FIG. 5. This programming may include implementations of the functions within one or more I/O device adapters 252,254 connected to a multi-function device 265. As an alternative, the dynamic configuration decision logic 430 may be a completely hardwired element including look-up tables stored in read only memory that are accessed by a programmable logic array to determine configuration parameters for the I/O device adapter 250 connected thereto. The choice of which implementation to utilize is a design choice that may be made by those of ordinary skill in the art.

Figure 3B:
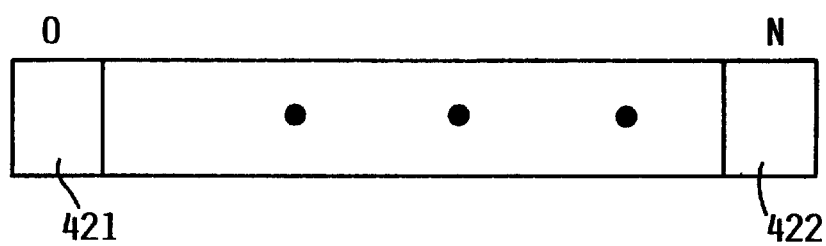
FIG. 3(b) illustrates a function configuration register that is utilized in the system of FIG. 3(a) for dynamic configuration of multi-function devices.

FIG. 3(*a*) illustrates a computer system for dynamically configuring a multi-function device 265. Like FIG. 2, FIG. 3(*a*) illustrates a computer system including a processor complex 100 having an I/O device driver 140 provided therein. An I/O bus 300 interconnects processor complex 100 and multi-function device 265. Preferably, the I/O bus 300 is a PCI bus 300*a* conforming to the PCI local bus specification.

As further shown in FIG. 3(*a*), the multi-function device 265 includes function routing/controlling facility 400 to which are attached a plurality of I/O device adapters 252, 254. The I/O device adapters 252, 254 are connected at respective slots or connection points that are labeled Function 0 through Function N. Although a single type of I/O device adapter 250 may be utilized, it is to be understood that a variety of types of I/O device adapters 252,254 may be connected to the multi-function device 265 thereby providing a plurality of different types of interfaces for different types of I/O devices 282, 284 connected to each I/O device adapter 252,254.

A function configuration register 420 is provided within the function routing/controlling facility 400. The function configuration register 420 is further shown in FIG. 3(*b*) and includes a READY/NOT READY flag 421,422 for each of the I/O device adapters 252, 252 connected to the function routing/controlling facility 400. In other words, each I/O device adapter 252,254 has a unique, corresponding READY/NOT READY flag 421,422 in the function configuration register 420.

Dynamic configuration decision logic 440 is also provided in the function routing/controlling facility 400 and is connected to the function configuration register 420 and to each of the I/O device adapters 252,254. Instead of individually connecting each I/O device adapter 252,254 to the dynamic configuration decision logic 440, a multiplexer, not shown, may be utilized to provide an appropriate, routed connection between the dynamic configuration initialization logic 440 and each of the I/O device adapters 252, 254 connected thereto and may be addressed by the device identifier and function number address from the processor complex 100 to select the desired I/O device adapter 250.

Operation of the Preferred Embodiments

Figure 4:
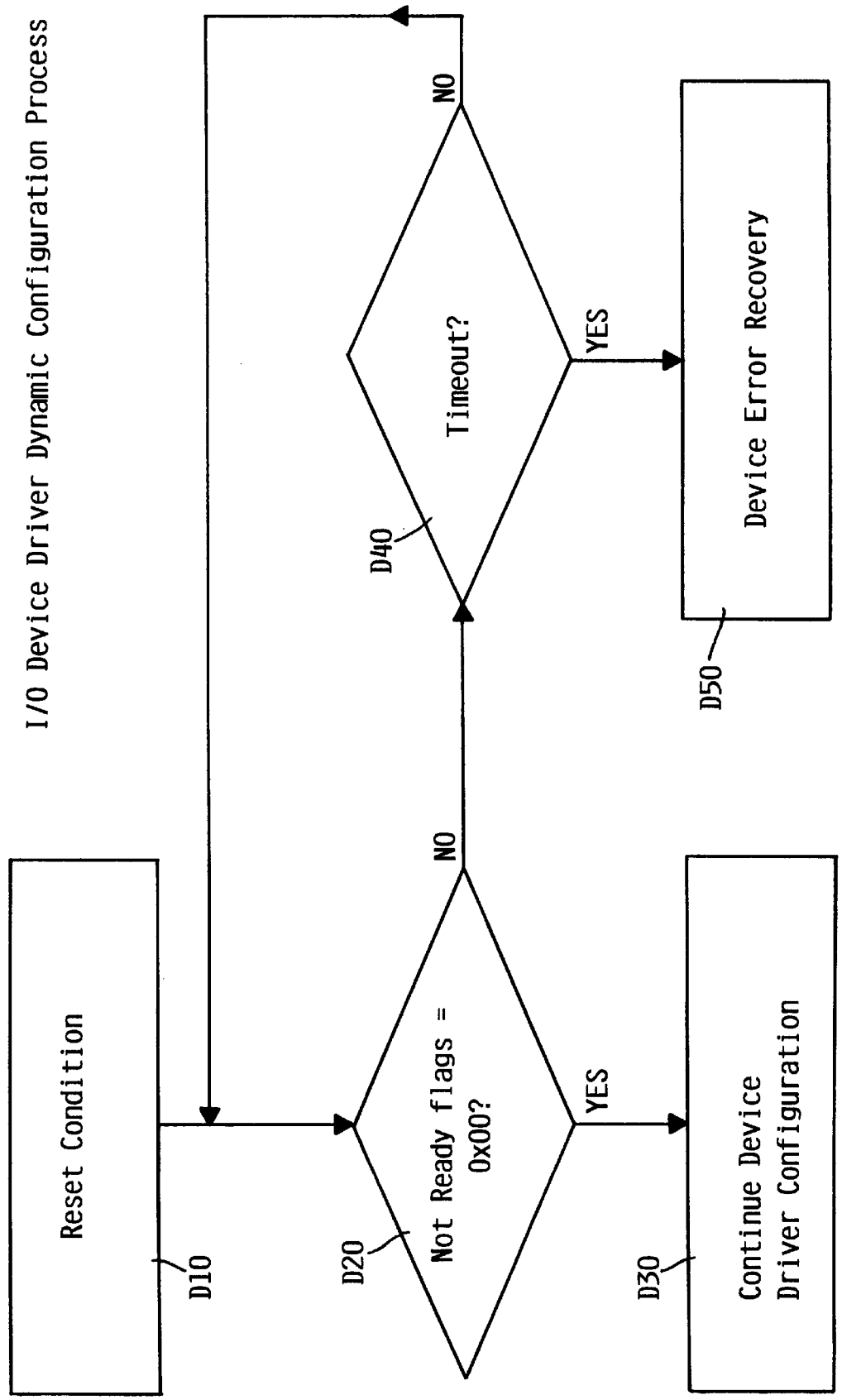
FIG. 4 illustrates a high-level flow chart of a dynamic configuration process performed by an I/O device driver.

Both the single-function and multi-function implementations of the dynamic configuration system operate by utilizing the process illustrated in FIG. 4.

The I/O device driver 140 and the processor complex 100 execute the process illustrated in FIG. 4. After a reset condition has occurred in step D10, the I/O device driver 140 initiates a configuration process. The initiation of the configuration process generally includes a built-in self-test (BIST) protocol that is part of the PCI local bus specification. After determining a successful built-in self test for a particular slot or connection point in the PCI local bus 230, then the configuration process may proceed. This configuration process is then interrupted by the series of decision steps shown in FIG. 4.

More particularly, after initiating the configuration process following the reset condition, the I/O device driver 140 then proceeds to decision step D20, where the NOT READY flags in the function configuration register 420 are examined. More particularly, the I/O device adapter 140 within processor complex 100 initiates a configuration read protocol to access the function configuration register 420 and thereby determine the status of the READY/NOT READY flags stored therein. The setting of the READY/NOT READY flags is further described in relation to FIG. 5 below.

If the NOT READY flags are not zero or, in other words, all of the I/O device adapters 252, 254 are not yet ready, then the I/O device driver 140 proceeds to step D40. Step D40 is a time out step that sets a time limit or time window in which the NOT READY flags must be set to a ready status. If the READY/NOT READY flags in the function configuration register 420 do not achieve a ready status within the time out period, then the I/O device driver 140 executes step D50 to initiate a device error recovery process. The device error recovery process is necessary because some error must have occurred for the I/O device adapters to not achieve a ready status within the time limit set in the time out step D40.

If, on the other hand, all of the flags in the function configuration register 420 indicate ready status for each of the I/O device adapters 252,254 in the multi-function device 265 within the time limit set in step D40, then the I/O device driver 140 can then continue with the device driver configuration process. The device driver configuration process is conventional from this point forward, and will not be further described below.

As described above, FIG. 4 illustrates the processing sequence executed by the I/O device driver 140 during dynamic configuration synchronization. The I/O device driver 140 reads the function configuration register 420 and checks the NOT READY flags against a value of all zeros. If the NOT READY flags are all zeros, then the decision logic 440 and the function routing/controlling facility 400 can continue with configuration of the I/O device adapters 252,254. If one or more of the NOT READY flags are a value of one, then a timer is checked for time out. If the time out has not occurred, then the I/O device driver 140 can loop back to check the NOT READY flags again. If the time out has occurred, then the I/O device driver 140 will perform the appropriate error recovery actions as defined by the system under consideration.

Figure 5:
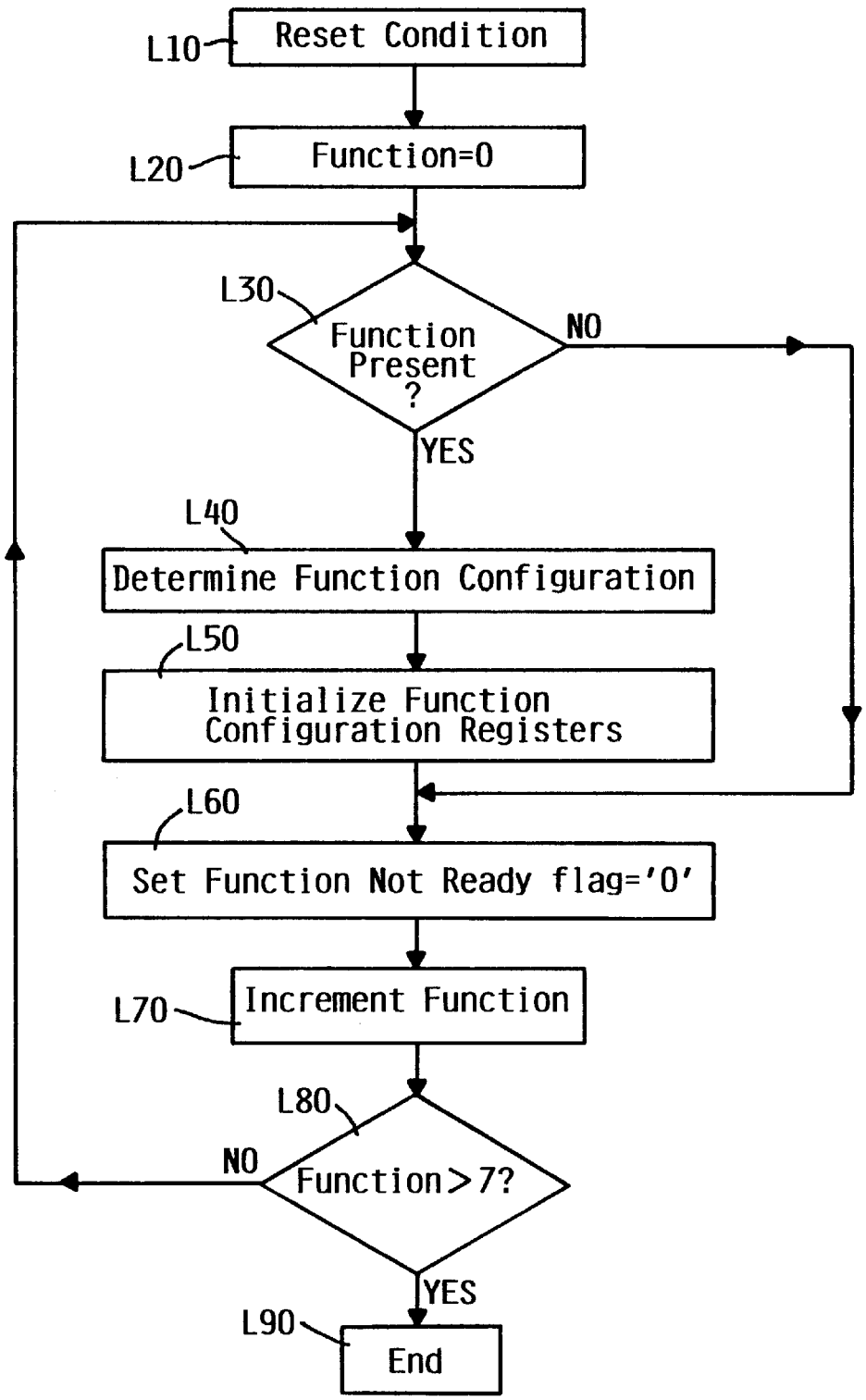
FIG. 5 is a high-level flow chart illustrating a dynamic configuration process performed by the dynamic configuration decision logic.

FIG. 5 illustrates the processing sequence executed by the dynamic configuration decision logic 440 during the dynamic configuration process. After a reset condition occurs in step L10, as further described in the related document number RO 997-133, the dynamic configuration logic 440 will then begin initialization of any functions (I/O device adapters 250) which are presently connected to the function routing/controlling facility 400. This initialization is a sequential process that begins with function slot 0 and proceeds to function slot N. If a function is present, the dynamic configuration decision logic 440 will then determine an appropriate function configuration, including configuration parameters desired for the I/O device adapter 250.

After determining an appropriate function configuration, the dynamic configuration decision logic 440 then initializes the configuration space 255 within the I/O device adapter 252, 254 by programming the configuration parameters determined for that I/O device adapter 250 into the configuration space 255. If a function is not present, with appropriate error checking, the dynamic configuration logic will then set the corresponding NOT READY flag in the function configuration register 420 to zero.

The corresponding NOT READY flag in the function configuration register 420 is also set for functions that are present and properly initialized with the determined configuration parameters. By sequentially proceeding through each of the functions, until the maximum function N is reached, the dynamic configuration logic 440 can dynamically configure and otherwise initialize each of the I/O device adapters 252,254 in the multifunction device 265.

More particularly in relation to FIG. 5, the process executed by the dynamic configuration decision logic begins with step L10 which is the reset action which triggers this process. Then, step L20 is executed which starts this process at function zero. Of course, any function slot may be set as the first slot to be checked in step L20 as appropriate. For clarity, function slot zero is selected in the illustrated process of FIG. 5.

Then, the dynamic configuration decision logic 440 begins a loop to check each of the functions beginning with step L30 that checks whether the current function is present. If the function is present as indicated by a physical connection of an I/O device adapter 250 in the corresponding function slot, then the dynamic configuration decision logic 440 executes step L40 which determines an appropriate function configuration for that I/O device adapter. A table look-up procedure or directed function configuration from the processor complex 100 may be utilized to determine the function configuration in step L40.

Step L50 proceeds step L40 and initializes the configuration space 255 by, for example, programming the function configuration registers therein with the configuration parameters determined in the function configuration determination step L40.

After step L50 or after determining that a function is not present, the dynamic configuration decision logic 440 then executes step L60 which sets a corresponding NOT READY flag in the function configuration register 420 to indicate READY status for the current function.

The process then increments the current function in step L70 and tests whether the last function has been reached. In this example, only eight functions may be present in the multi-function device 265 so that step L80 checks the current function against the function number limit (7). If there are functions left to dynamically configure, the process loops back to step L30, otherwise, the process ends as indicated by step L90.

The dynamic configuration processes shown in FIGS. 4 and 5 are synchronized by step D20. As the dynamic configuration logic executes step L60 to set the flags in the function configuration register 420 indicating a READY status for the corresponding I/O device adapter 252,254, the I/O device driver 140 executes step D20 to check the configuration register 420 for this READY status. If READY status can be confirmed for the entire function configuration register 420 within the timeout period, then the I/O device driver 140 can then continue with device driver configuration. In this way, the processes illustrated in FIGS. 4 and 5 are synchronized.

The above operation has been described in relation to a multi-function device 265; however, the same processes may be utilized for the single-function device 245 illustrated in FIG. 2. The differences in these processes are as follows. As noted above, the single-function device 245 only requires a single NOT READY flag in the function configuration register 410. Therefore, the decision logic 430 need only check for the presence of one I/O device adapter 250 when executing step L30. Furthermore, the loop shown in FIG. 5 including steps L20, L70 and L80 are unnecessary as only a single-function may be present within the single function device 245. Otherwise, the process performed by the dynamic configuration decision logic 430 for a single-function device 245 is substantially similar to the processing performed by the dynamic configuration decision logic 440 for a multi-function device 265.

As illustrated in FIG. 1, conventional systems may include both a single function device 240 and a multi-function device 260 connected to the local bus 230. The present invention may accommodate such networks by utilizing either a granular or global dynamic configuration.

In global dynamic configuration, each function configuration register 410, 420 within each single function device 245 and multi-function device 265 is examined by step D20. If all of the configuration registers indicate a ready status within the timeout period (step D40), then step D30 is executed to continue the device driver configuration process. Otherwise, a device error recovery process is performed in step D50.

In a granular dynamic configuration process, each single function device 245 and each multifunction device 265 is an independent entity that may be dynamically configured or subject to error recovery independent of the other devices 245, 265. In other words, the failure of the dynamic configuration process to dynamically configure one or more of the single function or multi-function devices 245, 265 will not effect the system ability to continue device driver configuration for the other devices 245,265.

This granular dynamic configuration process may be implemented with the invention described above by individually performing the dynamic configuration processes shown in FIGS. 4 and 5. Those single or multi-function devices 245,265 unable to configure within the timeout period will be individually subject to the device error recovery step D50. On the other hand, those single or multi-function devices 245,265 that are able to configure within the timeout period will be allowed to continue device driver configuration in step D30.

The reset condition illustrated in Steps D10 and L10 of FIGS. 4 and 5 triggers the dynamic configuration decision logic process executed by the I/O device driver 140 and the dynamic configuration decision logic 440, respectively. The reset condition L10 may be a power on reset (POR) By utilizing the dynamic configuration decision logic process illustrated in FIGS. 4 and 5, the processor complex 100 can then know when the configuration spaces 255 may be effectively utilized or accessed to control the I/O device adapters 252, 254.

Alternatively, the reset condition may occur during a procedure wherein an I/O device adapter 252 is removed, added, or replaced with a different I/O device adapter 250. Such procedures are not currently addressed in conventional systems wherein I/O device adapter functions become present or absent following such procedures. The present invention permits such procedures by dynamically configuring the I/O device adapters 252,254 in response to such procedures.

As a further alternative, the reset condition may be generated by the processor complex 100 to designate at least one of the configuration parameters of one or more I/O device adapters 252,254 by utilizing the dynamic configuration process and system of this invention. In this way, the processor complex 100 can dynamically reconfigure the various I/O device adapters 252,254 connected to the system.

The invention may be further applied to a multi-function device configuration that results when an I/O device adapter with enhanced capability is added to an available connection of an existing multi-function device configuration. The I/O device adapter with enhanced capability is capable of performing I/O device adapter control responsibilities for the other I/O device adapters 252,254 within that multi-function device 260. In this configuration, the enhanced capability I/O device adapter function takes control of the other I/O device adapter functions and disables them from responding on the PCI local bus 230 as functions of the multi-function device 260, so that only the enhanced capability I/O device adapter appears to the processor complex 100 as a function of that multi-function device 260. This reduces processor complex resource requirements for control of the I/O device adapters connected to the PCI multi-function device 260, by dynamically "offloading" these control functions to the enhanced capability I/O device adapter when it is present.

The present invention provides for the flexibility to configure the same multi-function device 260 and I/O device adapters 252,254 with or without the enhanced capability I/O device adapter, according to the overall requirements of the complete computing system. As described above, this invention provides for this dynamic configuration by creating the dynamic configuration decision logic 440, and providing mechanisms for the processor complex and I/O device adapters to interact with the dynamic configuration decision logic 440 to achieve the dynamic configurability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for dynamically configuring a plurality of I/O device adapters, comprising:
    a processor complex including a central processing unit and a memory connected thereto;
    a function routing/controlling facility having the plurality of I/O device adapters connected thereto;
    a bus connecting said processor complex and said function routing/controlling facility;
    said function routing/controlling facility transmitting data and/or control signals between said processor complex and at least one of said plurality of I/O device adapters via said bus;
    a function configuration register provided in said function routing/controlling facility, said function configuration register having a READY/NOT READY flag for each of the plurality of I/O device adapters;
    dynamic configuration decision logic provided in conjunction with said function routing/controlling facility, said dynamic configuration logic detecting which of said I/O device adapters are connected to said function router and control facility, determining configuration parameters for each I/O device adapter that is connected to said function routing/controlling facility, initializing a configuration space for each connected I/O device adapter with the determined configuration parameters, and setting corresponding flags in said function configuration register to indicate ready status;
    said dynamic configuration decision logic being triggered by a reset condition.

2. The system according to claim 1, said processor complex including an I/O device driver,
    said I/O device driver interrupting a bus configuration process in response to the reset condition to confirm the ready status stored in said function configuration register corresponding to each of the I/O device adapters before continuing with the bus configuration process.

3. The system according to claim 2,
    said I/O device driver confirming the ready status within a timeout window and, if the timeout window expires without said device driver confirming the ready status, then said I/O device driver executes a device error recovery process.

4. The system according to claim 1, wherein the reset condition is a power on reset.

5. The system according to claim 1, wherein the reset condition is generated by a procedure that adds, removes and/or replaces at least one of the I/O device adapters.

6. The system according to claim 1, wherein said processor complex generates the reset condition and then sends at least one configuration parameter to said dynamic configuration decision logic via said bus to thereby establish at least one of the configuration parameters for at least one of the I/O device adapters.

7. The system according to claim 1, further comprising:
    a multifunction device connected to said bus and including said function routing/controlling facility.

8. The system according to claim 1, further comprising:
    a plurality of multifunction devices each connected to said bus and each including said function routing/controlling facility and said function configuration register,
    said processor complex including an I/O device driver,
    said I/O device driver interrupting a global dynamic configuration process in response to the reset condition to confirm the ready status stored in all of said function configuration registers corresponding to each of the I/O device adapters before continuing with the global configuration process,
    said I/O device driver confirming the ready status within a timeout window and, if the timeout window expires without said device driver confirming the ready status, then said I/O device driver executes a device error recovery process.

9. The system according to claim 8, wherein the reset condition is a power on reset.

10. The system according to claim 8, wherein the reset condition is generated by a procedure that adds, removes and/or replaces at least one of the I/O device adapters.

11. The system according to claim 8, wherein said processor complex generates the reset condition and then sends at least one configuration parameter to at least one of said dynamic configuration decision logic via said bus to thereby establish at least one of the configuration parameters for at least one of the I/O device adapters.

12. The system according to claim 1, further comprising:
    a plurality of multifunction devices each connected to said bus and each including said function routing/controlling facility and said function configuration register,
    said processor complex including an I/O device driver,
    said I/O device driver performing a granular dynamic configuration process that, in response to the reset condition, confirms the ready status stored in each of said function configuration registers corresponding to each of the I/O device adapters before continuing with the granular configuration process for the I/O device adapters which are ready.

13. The system according to claim 12,
    said I/O device driver confirming the ready status within a timeout window and, if the timeout window expires without said device driver confirming the ready status, then said I/O device driver executes a device error recovery process.

14. The system according to claim 12, wherein the reset condition is a power on reset.

15. The system according to claim 12, wherein the reset condition is generated by a procedure that adds, removes and/or replaces at least one of the I/O device adapters.

16. The system according to claim 12, wherein said processor complex generates the reset condition and then sends at least one configuration parameter to at least one of said dynamic configuration decision logic via said bus to thereby determine at least one of the configuration parameters for at least one of the I/O device adapters.

17. The system according to claim 1,
said bus including a processor complex memory bus connecting said central processing unit and said memory and a local bus connected to said function routing/controlling facility,
the system further comprising a host bridge interconnecting said processor complex memory bus and said local bus.

18. The system according to claim 17, wherein said local bus is a PCI bus and said bridge is a PCI host bridge.

19. The system according to claim 1, said dynamic configuration decision logic provided in said function routing/controlling facility.

20. The system according to claim 1, said dynamic configuration decision logic is provided in each of the I/O device adapters.

21. The system according to claim 1, said dynamic configuration decision logic is shared between said function routing/controlling facility and the I/O device adapters.

22. An apparatus for dynamically configuring an I/O device adapter, comprising:
a function routing/controlling facility having the I/O device adapter connected thereto, said function routing/controlling facility transmitting data and/or control signals between the I/O device adapter and a bus connected to said function routing/controlling facility;
a function configuration flag located in said function routing/controlling facility, said function configuration flag storing a READY/NOT READY status corresponding to said I/O device adapter; and
dynamic configuration decision logic provided in conjunction with said function routing/controlling facility, said dynamic configuration decision logic determining at least one configuration parameter for said I/O device adapter, initializing a configuration space in said I/O device adapter with the at least one determined configuration parameter, and setting said function configuration flag to indicate READY status,
said dynamic configuration decision logic being triggered by a reset condition.

23. The apparatus according to claim 22, further comprising:
an I/O device driver connected to the bus,
said I/O device driver interrupting a configuration process in response to the reset condition to confirm the ready status stored in said function configuration flag before continuing with the configuration process.

24. The apparatus according to claim 23,
said I/O device driver confirming the ready status within a timeout window and, if the timeout window expires without said device driver confirming the ready status, then said I/O device driver executes a device error recovery process.

25. The apparatus according to claim 22, wherein the reset condition is a power on reset.

26. The apparatus according to claim 23, wherein the reset condition is a power on reset.

27. A system of single function devices, each of which includes said function routing/controlling facility, said function configuration flag, and said dynamic configuration decision logic according to claim 22, the system further comprising:
an I/O device driver connected to the bus, said I/O device driver interrupting a global configuration process in response to the reset condition to confirm the READY status stored in all of said function configuration flags corresponding to each of the I/O device adapters before continuing with the global configuration process.

28. The system according to claim 27, wherein the reset condition is a power on reset.

29. The system according to claim 27, wherein the reset condition is generated by a procedure that adds, removes and/or replaces at least one of the I/O device adapters.

30. A system of single function devices, each of which includes said function routing/controlling facility, said function configuration flag, and said dynamic configuration decision logic according to claim 22, the system further comprising:
an I/O device driver connected to the bus, said I/O device driver interrupting a granular configuration process in response to the reset condition to confirm the ready status stored in each of said function configuration flags corresponding to each of the I/O device adapters before continuing with the granular configuration process for the I/O device adapters which are ready.

31. The system according to claim 30, wherein the reset condition is a power on reset.

32. The system according to claim 30, wherein the reset condition is generated by a procedure that adds, removes and/or replaces at lease one of the I/O device adapters.

33. The system according to claim 22, said dynamic configuration decision logic provided in said function routing/controlling facility.

34. A method of dynamically configuring a plurality of I/O device adapters connected to an I/O bus via a function routing/controlling facility, comprising the steps of:
providing the function routing/controlling facility with a function configuration register having a ready/not ready flag corresponding to each of the plurality of I/O device adapters;
transmitting data and/or control signals between a processor complex connected to the I/O bus and at least one of the plurality of I/O device adapters via the function routing/controlling facility;
detecting which of the I/O device adapters are connected to the function routing/controlling facility;
determining at least one configuration parameter for each I/O device adapter that is connected to the function routing/controlling facility;
initializing a configuration space in each connected I/O device adapter with the configuration parameter determined in said determining step, and
setting corresponding ready flags in the function configuration register to indicate ready status in response to completion of said initializing step,
said detecting, determining, initializing and setting steps being performed in response to a reset condition.

35. The method according to claim 34, further comprising the steps of:
initiating an I/O configuration process; and interrupting the I/O configuration process in response to the reset condition to confirm the ready status stored in the function configuration register by said setting step before continuing with the configuration process.

36. The method according to claim 35, said interrupting step including a time limit wherein the ready status must be confirmed within the time limit, the method further comprising the step of:

executing a device error recovery process if the time limit expires without said interrupting step confirming the ready status.

37. The method according to claim 34, wherein the reset condition is a power on reset.

38. The method according to claim 34, wherein the reset condition is generated by a procedure that adds, removes and/or replaces at least one of the I/O device adapters.

* * * * *